No. 659,965. Patented Oct. 16, 1900.
L. G. HALLBERG.
FIREPROOF FLOORING.
(Application filed Mar. 5, 1896.)
(No Model.) 3 Sheets—Sheet 1.
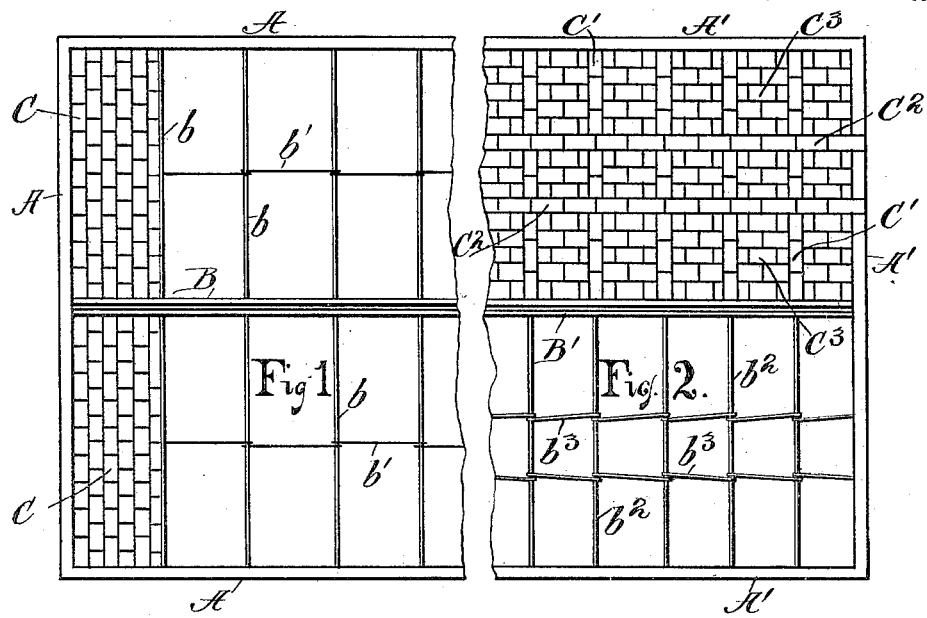
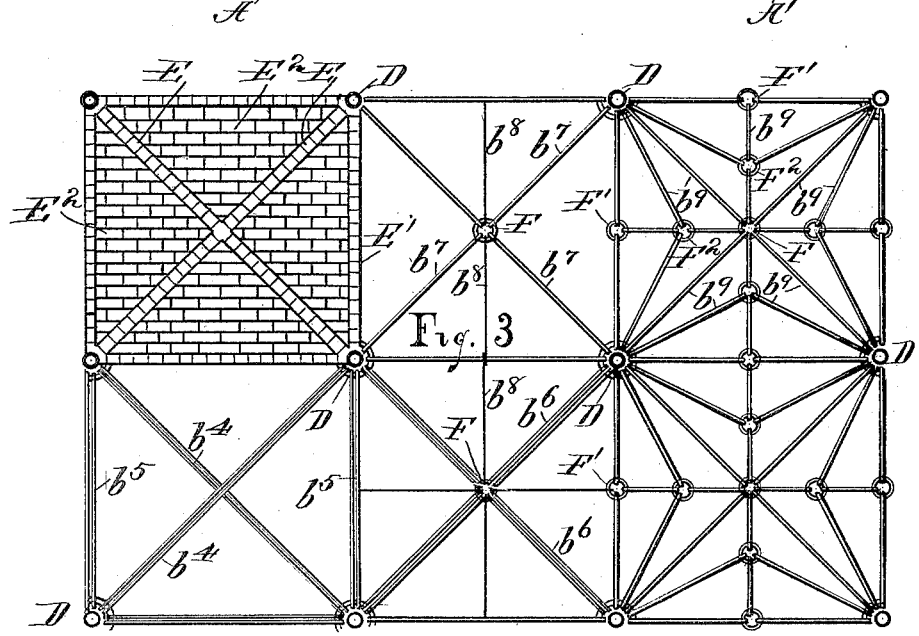
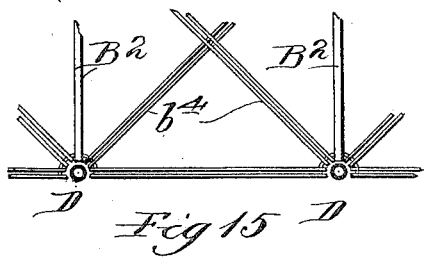
Witnesses.
J. H. Alexander.
O. A. Johannsen.
Inventor
L. G. Hallberg.
Coburn & Strong
Attorneys.

No. 659,965. Patented Oct. 16, 1900.
L. G. HALLBERG.
FIREPROOF FLOORING.
(Application filed Mar. 5, 1896.)
(No Model.) 3 Sheets—Sheet 2.
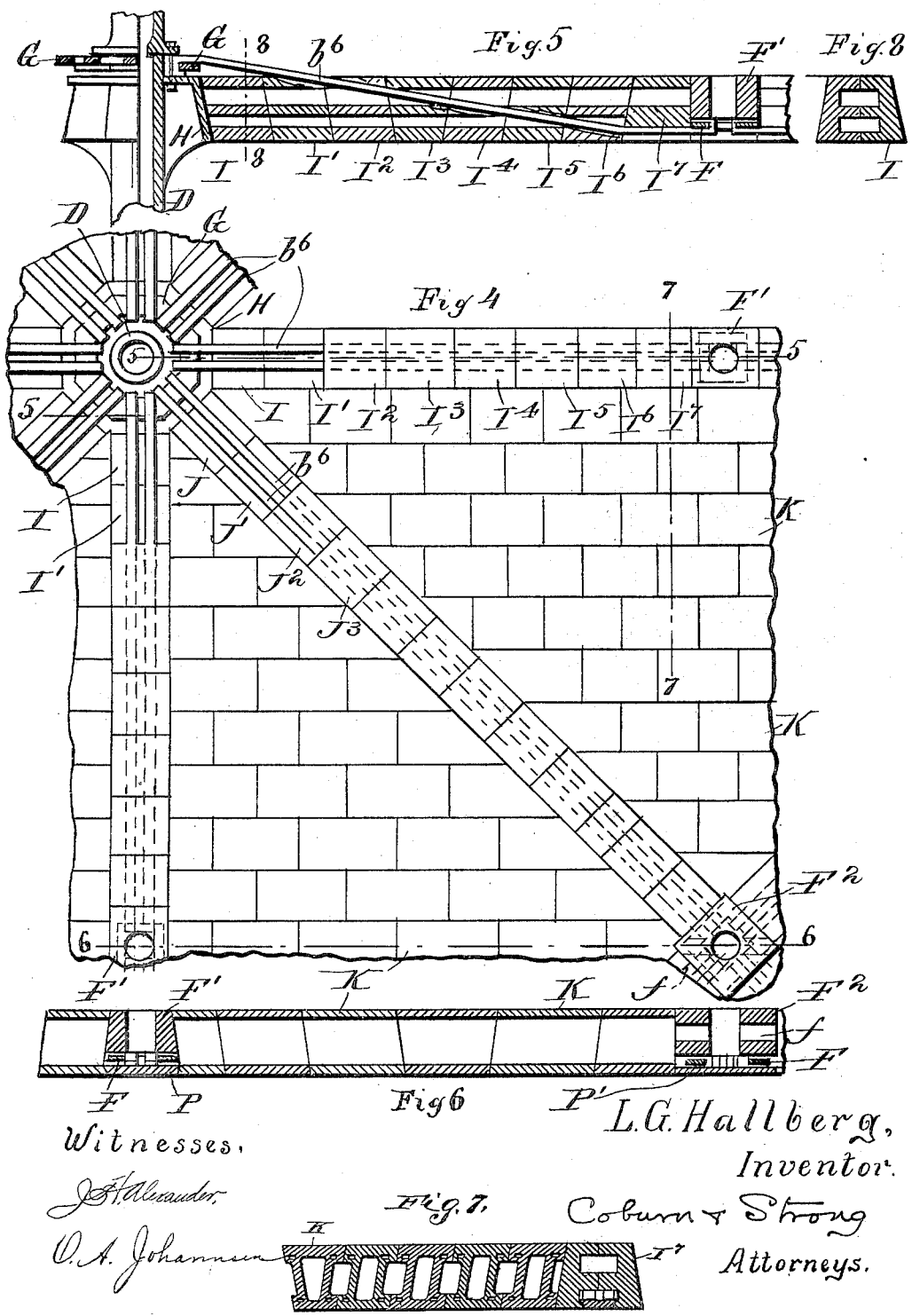
Witnesses,
J. F. Alexander,
O. A. Johannsen
L. G. Hallberg,
Inventor.
Coburn & Strong
Attorneys.

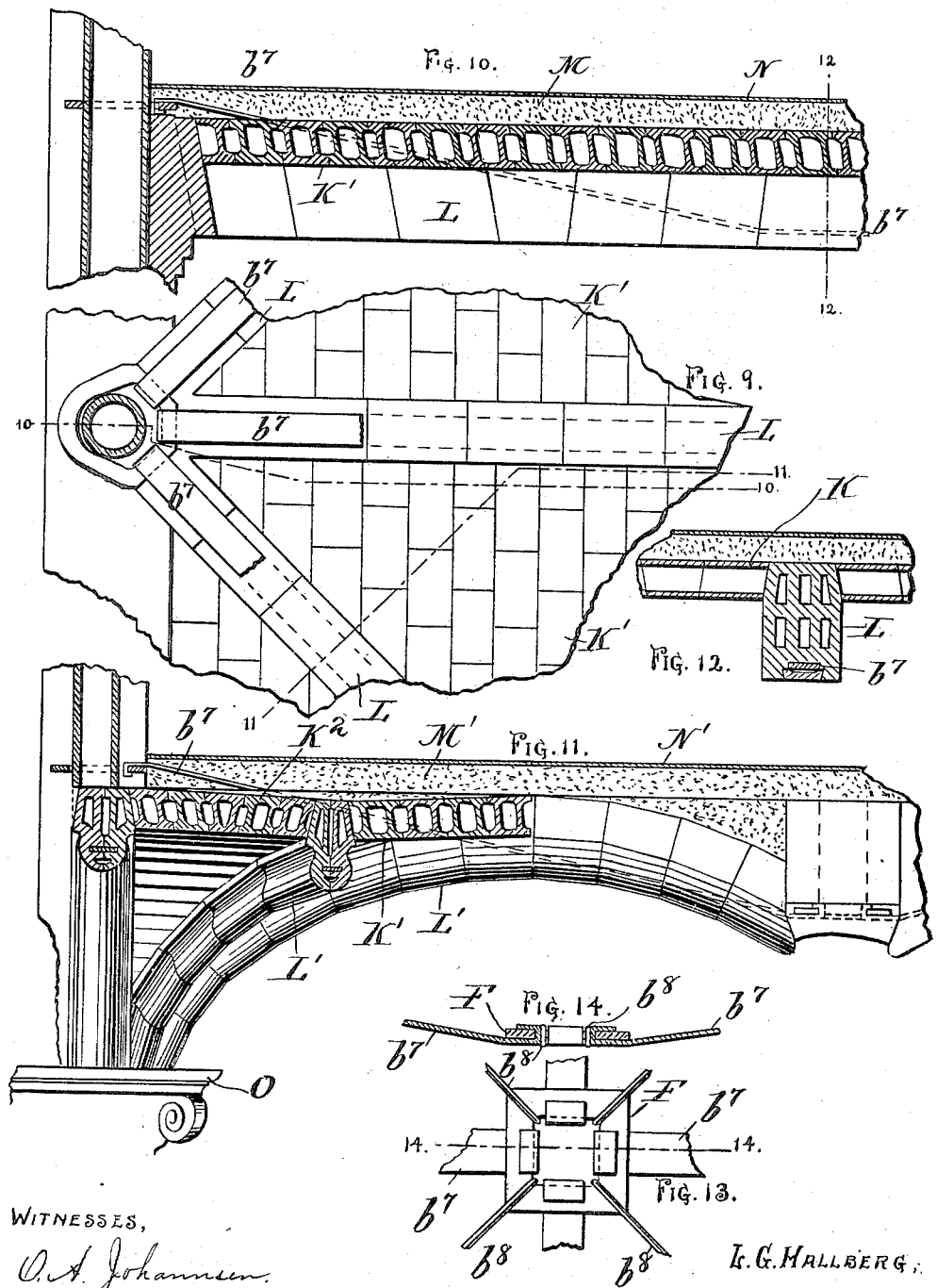

UNITED STATES PATENT OFFICE.

LAWRENCE GUSTAV HALLBERG, OF CHICAGO, ILLINOIS.

FIREPROOF FLOORING.

SPECIFICATION forming part of Letters Patent No. 659,965, dated October 16, 1900.

Application filed March 5, 1896. Serial No. 581,902. (No model.)

*To all whom it may concern:*

Be it known that I, LAWRENCE GUSTAV HALLBERG, a citizen of the United States, residing at Chicago, in the county of Cook and State of Illinois, have invented a certain new and useful Improvement in Fireproof Flooring, which is fully set forth in the following specification, reference being had to the accompanying drawings, in which—

Figure 1 is a general plan of a portion of a tile flooring as the same is commonly constructed. Fig. 2 is a general plan of such a flooring as constructed according to one method in which my invention may be carried out. Fig. 3 is a general plan of such a flooring according to another method in which my invention may be carried out, which method is the particular subject-matter of my present application. Fig. 4 is a plan, enlarged, of a portion of a tile flooring such as that shown in Fig. 3. Fig. 5 is a vertical section on the line 5 5 of Fig. 4. Fig. 6 is a vertical section on the line 6 6 of Fig. 4. Fig. 7 is a vertical section on the line 7 7 of Fig. 4. Fig. 8 is a vertical section on the line 8 8 of Fig. 5. Fig. 9 is a plan of another portion of a flooring, such as that shown in Fig. 3, with certain modifications. Fig. 10 is a vertical section on the line 10 10 of Fig. 9. Fig. 11 is a section on the line 11 11 of Fig. 9, exhibiting, however, certain further modifications. Fig. 12 is a section on the line 12 12 of Fig. 10. Fig. 13 is a detail view in plan of the collar supporting the center tile, with the attachments thereto. Fig. 14 is a section on the line 14 14 of Fig. 13. Fig. 15 is a detail view in plan of a portion of the skeleton structure shown in Fig. 3, exhibiting certain modifications.

It is the object of my invention to construct a fireproof tile flooring requiring the use of few or no transverse beams, thereby cheapening the construction and rendering possible the application of fireproof flooring to many structures to which the cost has hitherto made it inapplicable. I attain this result by employing a system of tension-rods, which support the tile flooring by their resistance to tensile strain, in the place of the usual transverse beams, which support the flooring by their resistance to bending strain. It is well known that this last-named resistance is much less for a given area of cross-section of beam or rod than a resistance to tensile strain. Hence by my system I decrease materially the weight of metal requisite for the support of the flooring. This system of tension-rods I supplement by a system of skewback tile supported directly thereon, which in turn support a system of flat-arch tile that form the body of the flooring. To show the relation of this form of construction to that form hitherto usually employed, I have shown in Fig. 1 of the drawings a plan of a portion of a (small) flooring constructed according to the latter form, in which A designates the walls, and B the main girders. The transverse beams $b$ extend from the girders B to the side walls of this building or to other girders in the case of a wider building, and may be spaced by the rods $b'\ b'$. Tile C are arched between the successive transverse beams $b$, which thus support the tile and the weight upon the floor by their resistance to bending strain.

It is the object of my invention to replace the beams $b$ by tension-rods, which are depressed as they approach the center of their span and so support any weight they may bear by their resistance to tensile strain. Upon these tension-rods are arranged skewback tile, which in turn support the tile of the body of the flooring.

According to one method in which my invention may be carried out, illustrated by the plan view in Fig. 2 of a portion of a flooring so constructed, I retain the girders B', supported upon the walls A', and I replace the beams $b$ by the tension-rods $b^2$, which support connecting-rods $b^3$, as shown. Upon the tension-rods $b^2$ is arranged a system of skewback tile C' and upon the connecting-rods $b^3$ a system of skewback tile $C^2$. Filling in between the two systems and supported thereby are the tile $C^3$, which are arched in two directions, and thus keyed upon the two systems C' and $C^2$. This method I have illustrated and described at length in another pending application, Serial No. 577,698, and to the details thereof I make no claim herein.

According to another method in which my invention may be carried out (illustrated in Figs. 3 to 15) I replace the girders B in part or altogether with columns D, from which the tension-rods $b^4$ and $b^5$, as shown in Fig. 3, are supported. In place of the tension-rods $b^5$, however, I may employ transverse beams $B^2$ between the columns, as shown in Fig. 15. Upon the tension-rods $b^4$ and $b^5$ are arranged skewback tile E and E', respectively. Between them are disposed the flat-arch tile $E^2$, which are arched in two directions, so as to receive support from all the skewback tile surrounding each panel.

In place of having the rods $b^4$ and $b^5$ extend unbroken from one column to another I may break them at their centers, as in the case of the rods $b^6$, joining the ends by collars F.

Still another modification is to replace the tension-rods $b^4$, $b^5$, and $b^6$, which I usually employ paired by broader ribbons $b^7$, which may be used singly, but otherwise are constructed and operate as do the rods $b^4$ $b^5$, &c.

To describe and illustrate in more detail the construction particularly referred to in the last two paragraphs, I have shown in plan in Fig. 4 a portion of a flooring so constructed and in Figs. 5, 6, 7, and 8 sections thereof. The tension-rods $b^6$ are hooked at one end over collars surrounding the columns D or are secured thereto in any other convenient manner. Such collars G, if used, may rest upon the shoulder formed by the circular or polygonal bracket H, formed at the upper end of each column. The tension-rods $b^6$ or the ribbons $b^7$, in case such be used, are hooked at their remaining ends or otherwise secured to the collars F, of which the general position is shown in Fig. 3 and the particular construction in Figs. 13 and 14. Upon each of the collars F is placed a central tile, (designated as F' in the case of those tension-rods running directly and $F^2$ in the case of the rods running diagonally between the columns.) The tile $F^2$ may be provided with the perforation $f$, which will permit its serving, in conjunction with the adjoining hollow tile, as a conduit for electric wires and the like. Between each of the central tile F' and the columns D there is strung upon the rods $b^6$ a system of skewback tile I' to $I^7$, inclusive. These skewback tile are of the flat-arch-tile form in longitudinal section, as shown in Fig. 5. They are skewback in cross-section, as shown in Figs. 7 and 8. Upon the tension-rods, between the central tile $F^2$ and the surrounding columns, are strung another series of flat-arch tile J' $J^2$ $J^3$, &c., which are likewise of the flat-arch form in longitudinal section and skewback in cross-section. These two systems of rods with skewback tile supported thereon constitute a skeleton, leaving triangular spaces or panels which are filled in by the flat-arch tile K, which tile K are arched in both directions, as shown in Figs. 6 and 7. Thus the tile K transmit their own weight and any weight which they may support in all directions to the surrounding skewback tile. These skewback-tile systems are, in effect, compound beams in which the tension-rods by their resistance to tensile strain and the tile strung thereon by their resistance to crushing support the weight of the floor-tiling K, which is keyed thereto.

As shown in Fig. 3, I may employ subsidiary supporting-rods $b^8$ in connection with the tension-rods $b^6$ or tension-ribbons $b^7$. Their attachment to the collar F is shown in Figs. 13 and 14. According to a further modification I may arrange the said rods or ribbons as shown in the right-hand portion of Fig. 3; in the case of the ribbons $b^9$, which are increased in number and further divided, to be attached to the collars F, F', and $F^2$, the number of which collars is enlarged, as shown.

Figs. 9 to 12 illustrate still further modifications of my invention by means of which I produce various raftered or vaulted effects, or both, in ceilings below a floor so constructed. Thus I may employ skewback tile of the form designated as L in place of the forms I and J, but corresponding in position thereto. The skewback tile L are of greater depth than and project below the tile K', which correspond to the tile K in the construction previously described. Not only is a raftered effect produced in the ceiling below, but also the tension-ribbon $b^7$ will possess the greater tensile resistance and the skewback tile themselves a greater resistance to crushing force. In a word, the beams will be stronger in proportion as they are deeper.

In Fig. 10 I have shown a concrete layer M spread upon the tile, upon the top of which is the ordinary floor N, of any material, whether wood, stone, or tile. Such a concrete flooring is clearly applicable, however, to any of the constructions previously described.

In Fig. 11 I have shown in vertical section, such as that along the line 11 11 of Fig. 9, another modification, according to which I employ a skewback tile L', corresponding to the skewback tile L and so to I and J, which tile L' spring in regular arched or vaulted form from capitals O upon the columns, producing both a paneled and vaulted effect in the ceiling below. In such case the intermediate arch tile $K^2$ follow the curvature of the skewback tile. Such a construction may also be covered with a layer of concrete M' and the usual flooring N', as in the other cases.

Throughout the constructions I have described I usually find it expedient to form the skewback tile, which are strung upon the tension rods or ribbons, divided in the middle, so that they may be easily set upon the said tension-rods. Further, to protect the tension rods or ribbons from heat at those points where they pass under the central tile F' and $F^2$ and similarly to protect the collars F in case such are used I place below the same the flat tile P and P', as shown in Fig. 6.

The operation of the various parts embodied in the construction which I have described and shown in forming a flooring will readily be seen and has already been referred to. In general it may be said that the tile by their form and arrangement transmit any downward thrust, as a lateral or spreading thrust, which is directly counterbalanced by the tensile resistance of the tension-rods. The flooring thus forms a rigid and homogeneous whole, the downward weight of which is supported by the walls or columns, or both, as the case may be.

Having now described my invention and some of the various modifications in which it may be carried out, I do not limit myself to any such specific form; but what I claim, and desire to secure by Letters Patent, is—

1. In a tile flooring, two or more systems of tension-rods; suitable supports for the ends thereof; skewback tile carried by the said tension-rods; and flat-arch tile having the operative surfaces of their sides and ends slanting convergingly downward so as to form a flat arch of each panel, arranged to transmit downward stress thereon horizontally in three or more directions to the skewback-tile systems between which it is located and by which it is supported.

2. In a tile flooring, the columns D; two or more systems of tension-rods attached thereto and supported thereby; skewback tile supported upon the said tension-rods; and flat-arch tile having the operative surfaces of their sides and ends slanting convergingly downward so as to form a flat arch of each panel, arranged to transmit downward stress thereon horizontally in three or more directions to the skewback-tile systems between which it is located and by which it is supported.

3. In a fireproof flooring, a series of suspension-rods; suitable supports for the ends thereof; skewback tile carried by the said suspension-rods, and disposed longitudinally in a flat-arch form; and suitable flooring material filling in between the skewback tile.

4. In a fireproof flooring, a series of suspension-rods; suitable supports for the ends thereof; skewback tile carried by the said suspension-rods, and disposed longitudinally in a flat-arch form; and flat-arch tile filling in between the skewback tile.

5. In a fireproof flooring, two or more systems of suspension-rods; suitable supports for the ends thereof; skewback tile carried by the said suspension-rods, and disposed longitudinally in flat-arch form; and flat-arch tile arched in two directions filling in between the skewback-tile systems and forming panels which are supported from all the surrounding skewback tile.

6. In a fireproof flooring, the columns D; two or more systems of suspension-rods attached thereto and supported thereby; skewback tile supported upon the said suspension-rods, and disposed longitudinally in a flat-arch form; and flat-arch tile arched in two directions filling in the panels between the systems of skewback tile and supported by all the surrounding skewback tile.

7. In a tile flooring, the column D; the bracket H; the collar G directly superimposed over and supported from the said bracket; and the suspension-rods hooked at one end over the said collar G.

8. In a fireproof flooring, the columns D; suspension-rods secured at one end thereto; and the collars F, to which the remaining ends of the said suspension-rods are secured.

9. In a fireproof flooring, the columns D; brackets H mounted upon the said columns; collars G directly superimposed over and supported from said brackets; suspension-rods hooked at one end over the collars G; and the collars F to which the remaining ends of the said suspension-rods are secured.

10. In a fireproof flooring, the columns D; brackets H mounted upon the said columns; the collars G directly superimposed over and supported from the said brackets; suspension-rods hooked at one end over the said collars G; collars F to which the remaining ends of the said suspension-rods are secured; skewback tile carried by the said suspension-rods; and suitable filling material filling in the panels between the skewback systems, so formed.

11. In a fireproof flooring, the column D; skewback bracket H mounted on the said column; the suspension-rods; and a series of tile carried by the said rods and contacting with the skewback bracket H.

12. In a fireproof flooring, the columns D; the skewback bracket H mounted thereon; the suspension-rods secured to the said columns; and a series of skewback tile disposed longitudinally in the form of a flat arch, carried by each said suspension-rod and contacting with the skewback bracket H.

13. In a fireproof flooring, the columns D; skewback brackets mounted on the said columns; suspension-rods secured to the said columns; skewback tile carried by the said suspension-rods and disposed longitudinally in the form of a flat arch, and contacting with the said skewback brackets; and a flat-arch tile filling in between the skewback-tile systems.

14. In a fireproof flooring, the columns D; skewback brackets H mounted on the said columns; the suspension-rods secured to the said columns; the central tile F′ carried and supported from the said suspension-rods; and a series of skewback tile carried by the said suspension-rods disposed longitudinally in a flat-arch form and contacting with the bracket H and the central tile F′.

15. In a tile flooring, suspension-rods; suitable supports for the ends thereof; skewback tile carried by the said suspension-rods and disposed in an arched form; and flat-arch tile filling in the panels between the said skewback tile, and secured thereto, the said arch tile being less in depth than the said skewback tile, whereby a paneled and vaulted effect is produced in the ceiling below.

L. GUSTAV HALLBERG.

Witnesses:
 HENRY GORDON STRONG,
 ALLAN A. MURRAY.